FIG-3

INVENTORS
ROBERT C. APPENZELLER
ROBERT E. LANG
DONALD A. LUDWIG
BY William R Jacox
ATTORNEY

INVENTORS
ROBERT C. APPENZELLER
ROBERT E. LANG
DONALD A. LUDWIG
BY *William R Jacox*
ATTORNEY

United States Patent Office 3,616,512
Patented Nov. 2, 1971

3,616,512
APPARATUS FOR INSERTING INSULATOR PIECES INTO STATOR SLOTS
Robert C. Appenzeller, Robert E. Lang, and Donald A. Ludwig, Dayton, Ohio, assignors to Machine Products Corporation, Dayton, Ohio
Filed Dec. 1, 1969, Ser. No. 881,238
Int. Cl. H02k 15/00
U.S. Cl. 29—205 E                20 Claims

ABSTRACT OF THE DISCLOSURE

Apparatus for inserting pieces of insulation or insulator material into slots of stators of electric machines in which the stator slots are of various dimensions. A continuous strip of insulation material is employed. The apparatus folds the strip at opposed edges thereof and thereby "cuffs" the strip at each of the opposed edges thereof. The strip is then severed to provide a piece of the insulation material which is of the proper length to insulate a given stator slot. The piece of insulation material is then formed properly to enter the given slot, and then the piece is forced into the given slot. Due to the fact that the stator slots are of various dimensions, the apparatus is arranged to cut and form each piece of insulation material, particularly for the slot within which the piece is intended to be inserted.

BACKGROUND OF THE INVENTION

Machines have been created for inserting pieces of insulation material into slots of a stator of an electric machine. However, so far as is known, prior art machines which employ a single strip of insulation material have been limited to insertion of pieces of the material into slots of a stator in which all of the slots thereof are of the same dimension.

It is an object of this invention to provide apparatus which is capable of employing a single strip of insulation material to provide pieces of the insulation material, each piece being severed to a predetermined length and formed to a desired shape for a predetermined slot of a stator which has slots of various dimensions and to insert the piece of the predetermined length and shape into the predetermined slot.

Figures 1, 2:
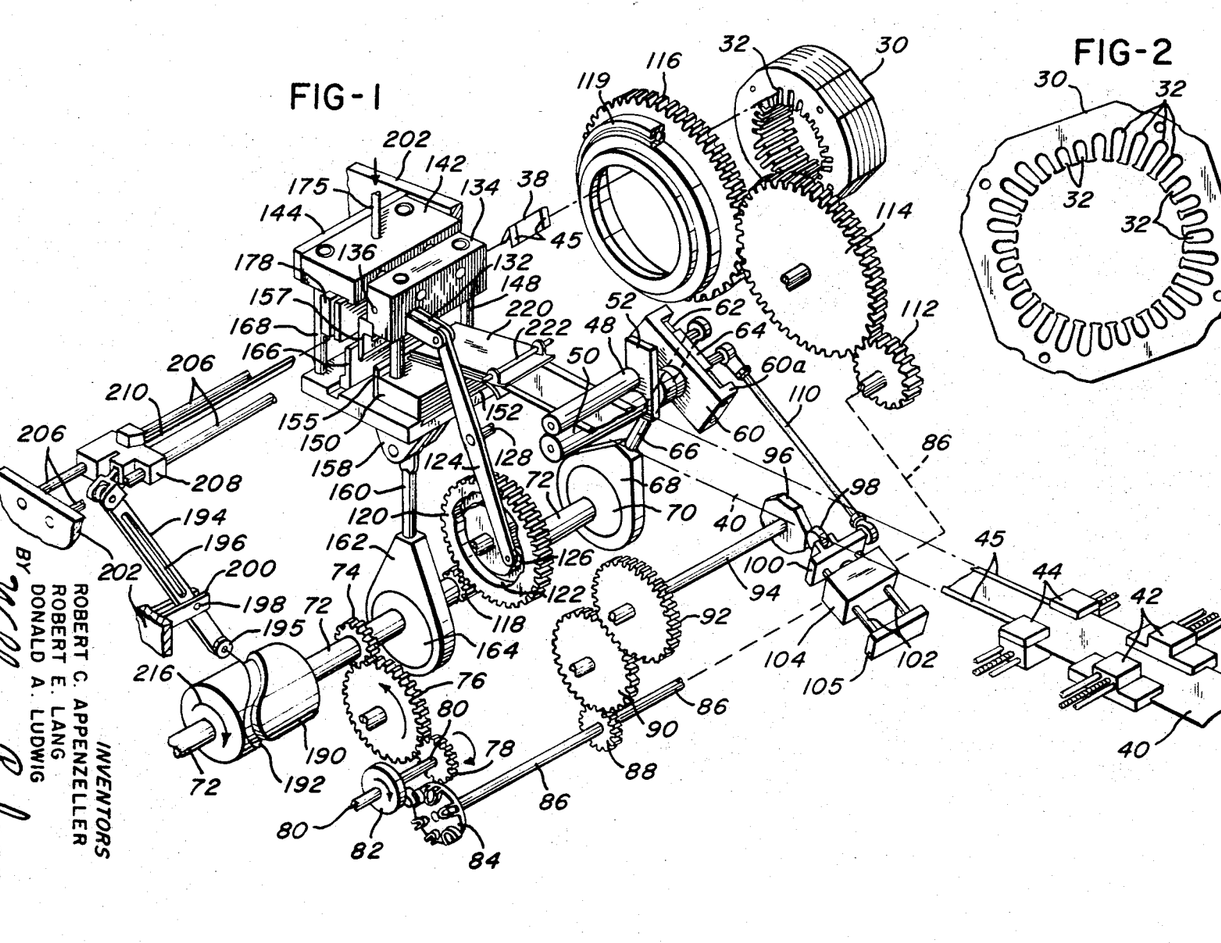
FIG. 1 is a diagrammatic type of perspective view showing apparatus of this invention for inserting pieces of insulation material into slots of a stator in which the slots are of various dimensions.
FIG. 2 is an end view, drawn on a slightly larger scale than FIG. 1, showing a typical stator and the slots thereof, into which the apparatus of this invention is adapted to insert pieces of insulation material.
Figures 16, 17, 20:
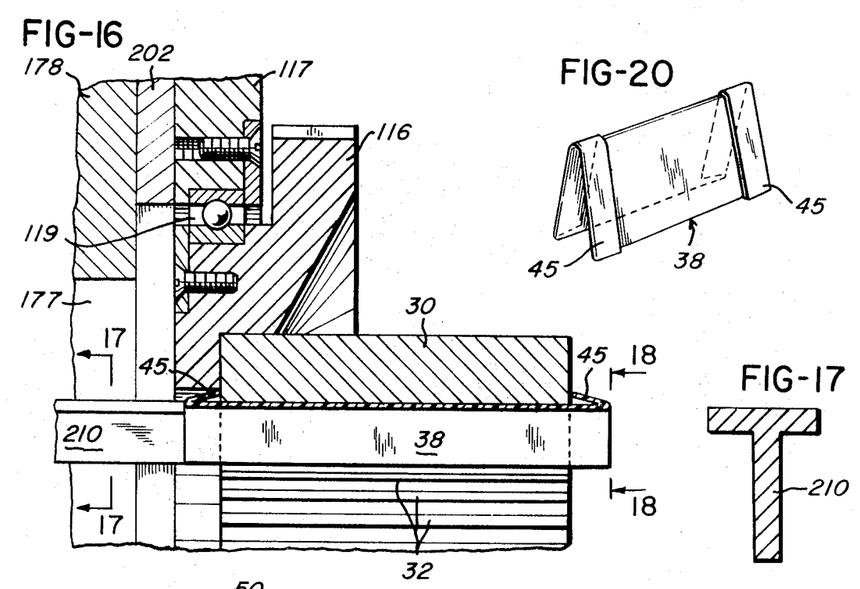
FIG. 16 is an enlarged fragmentary sectional view showing a retainer member and a stator retained thereby with a piece of insulation material inserted into a slot thereof.
FIG. 17 is an enlarged sectional view taken substantially on line 17—17 of FIG. 16.
FIG. 20 is a perspective view, drawn on a slightly smaller scale than FIG. 19, showing an insulator piece which is formed and inserted into a stator slot by the apparatus of this invention.
Figure 18:
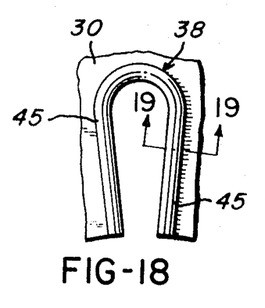
FIG. 18 is an enlarged fragmentary elevational view taken substantially on line 18—18 of FIG. 16.
Figure 19:
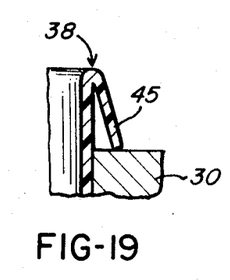
FIG. 19 is a sectional view taken substantially on line 19—19 of FIG. 18.

Referring to the drawings in detail, the apparatus of this invention is capable of automatically forming and inserting pieces of insulator material into slots of a stator, such as a stator 30, shown in FIGS. 1, 2, and 16. The stator 30 has stator slots 32, some of which are of given dimensions, others of which are of smaller dimensions and others of which are of larger dimensions.

Insulator pieces, such as the insulator piece 38, shown in FIG. 20, are produced from a continuous strip 40 of insulator material, shown in FIG. 1. The insulator material may be any suitable insulator material. For example, the insulator material may be that referred to by the trademark Mylar or the insulator material may be a suitable coated paper material, or the like. Due to the fact that the slots 32 of the stator 30 are of various dimensions, the insulator pieces 38, inserted therein must be of various lengths.

Figure 3:
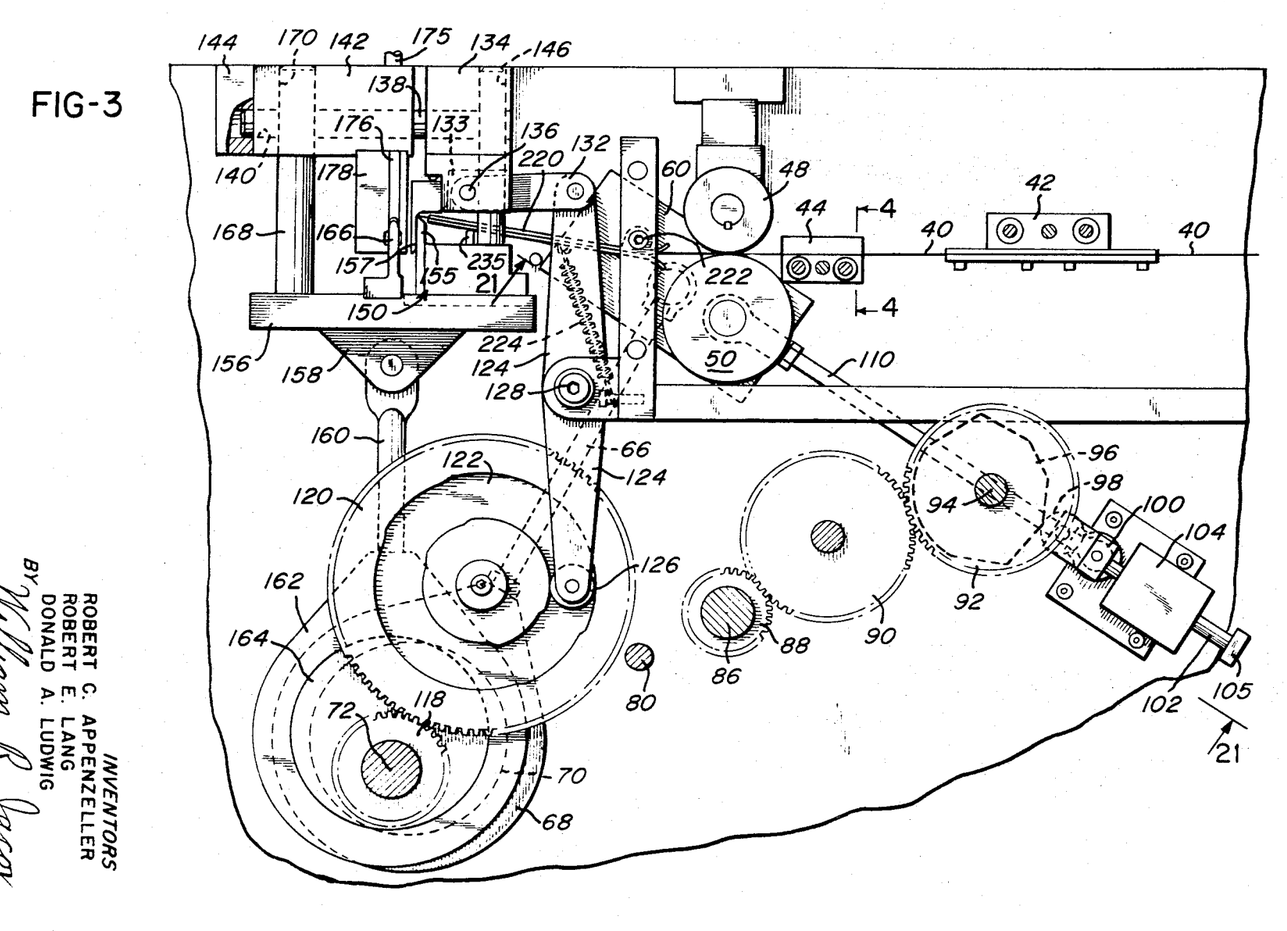
FIG. 3 is a fragmentary elevational view, with parts shown in section, drawn on a larger scale than FIG. 1, of apparatus of this invention.
Figure 4:
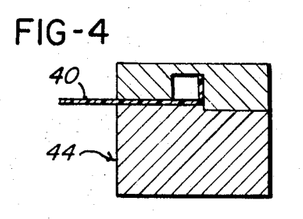
FIG. 4 is an enlarged sectional view taken subtantially on line 4—4 of FIG. 3, showing a portion of a cuffing device of the apparatus of this invention.
Figure 5:
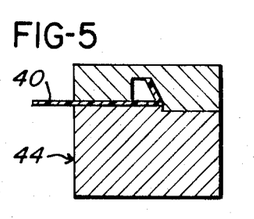
FIG. 5 is a sectional view similar to FIG. 4 but showing the cuffing device in a succeeding position of operation.
Figure 6:
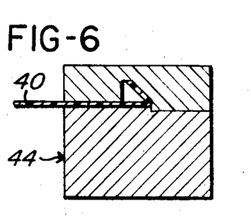
FIG. 6 is a sectional view similar to FIGS. 4 and 5 but showing the cuffing device in a succeeding position of operation.

FIGS. 1 and 3 show the strip 40 of insulator material as it moves first between the guide members 42 and then between cuffing members 44. The cuffing members 44 progressively turn or fold the opposite edge portions of the strip 40, as illustrated in FIGS. 4–8. Thus, the edge portions of the strip 40 are folded back substantially 180 degrees by the cuffing members 44 and cuffs 45 are formed, which are best shown in FIG. 20.

Then the strip 40 moves between feed rolls 48 and 50 which are in parallel juxtaposed relationship and are rotatably carried by support structure 52, as shown in FIG. 1. Means, not shown, such as gear members or the like operatively joint the rolls 48 and 50 together for rotation one with the other.

Figure 21:
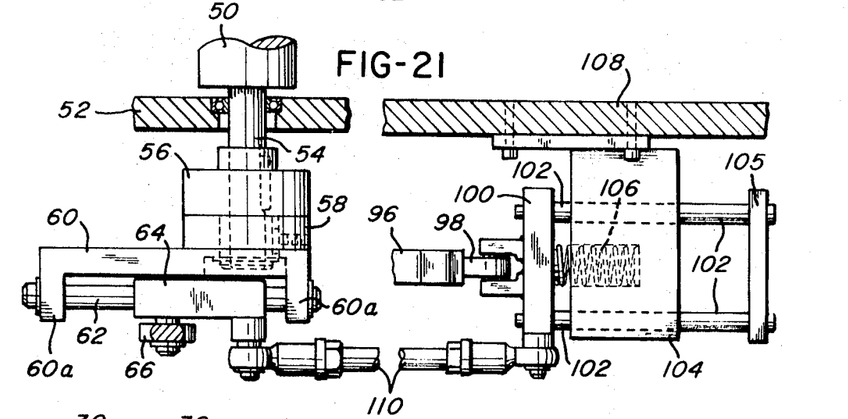
FIG. 21 is an enlarged fragmentary sectional view taken substantially on line 21—21 of FIG. 3.

The roll 50, as shown in FIG. 21, has a shaft 54 which is secured to a driven clutch member 56, for rotation therewith. A driver clutch member 58 is rotatably carried by the shaft 54 and is operable joined to the driven clutch member 56 for rotative movement thereof with a rotative movement of the driven clutch member 56 in only one direction thereof. Thus, the connection between the driver clutch member 58 and the driven clutch member 56 may be a ratchet type of connection or the like. When the driver clutch member 58 rotatably moves in the opposite direction there is no rotative movement of the driven clutch member 56.

Secured to the driver clutch member 58 is a yoke 60 which has an end portion 60a at each end thereof. A rod 62 is attached to each end portion 60a and extends therebetween. A slide block 64 is slidably carried by the rod 62 and is slidably movable between the end portions 60a of the yoke 60.

A crank arm 66 has an end portion thereof pivotally attached to the slide block 64. The other end portion of the crank arm 66 is attached to an annular collar member 68 which encompasses an eccentric 70, as shown in FIG. 1. The eccentric 70 is secured to a main shaft 72 which is attached to any suitable motor means 73, shown in FIG. 13, for rotation of the shaft 72.

A gear member 74, which is attached to the main shaft 72, is in meshed relationship with an idler gear 76. The idler gear 76 is in meshed relationship with a gear member 78, which is attached to a shaft 80 for rotation thereof. The shaft 80 also has attached thereto a Geneva driver 82, which drives a Geneva wheel 84. The Geneva wheel 84 is attached to a shaft 86 for rotation thereof.

Also, attached to the shaft 86 is a gear 88, which is in meshed relationship with an idler gear 90, which is meshed with a driven gear 92. The gear 92 is attached to a shaft 94 for rotation thereof. Also, attached to the shaft 94 is a cam 96.

A cam follower 98, which is shown herein as being rotatable, is in engagement with the cam 96. The cam follower 98 is carried by a carrier 100, which is supported by a plurality of support rods 102 which are supported by a stationary support block 104 and are axially slidably movable with respect thereto. A connector 105 joins the support rods 102 one to the other. A resilient member 106 engages the carrier 100 and the support block 104 and urges the carrier 100 in a direction away from the support block 104 and toward the cam 96. Thus, the resilient member 106 urges the cam follower 98 into engagement with the cam 96. The support block 104 is supported by support structure 108, as shown in FIG. 21.

Pivotally attached to the carrier 100 is one end of a rod 110. The other end of the rod 110 is pivotally attached to the slide block 64, to which one end of the crank arm 66 is pivotally attached.

The shaft 86 also has attached thereto a gear 112, shown in FIG. 1 which is meshed with a gear 114. The gear 114 is in meshed relationship with peripheral teeth of a stator retainer member 116. The stator retainer member 116 is rotatably supported by a support member 117 which has a bearing member 119, as shown in FIG. 16. The stator 30, shown in FIGS. 1 and 2 and discussed above, is retained by the stator retainer member 116 for rotary movement therewith.

Figures 7, 8, 9, 10, 11:
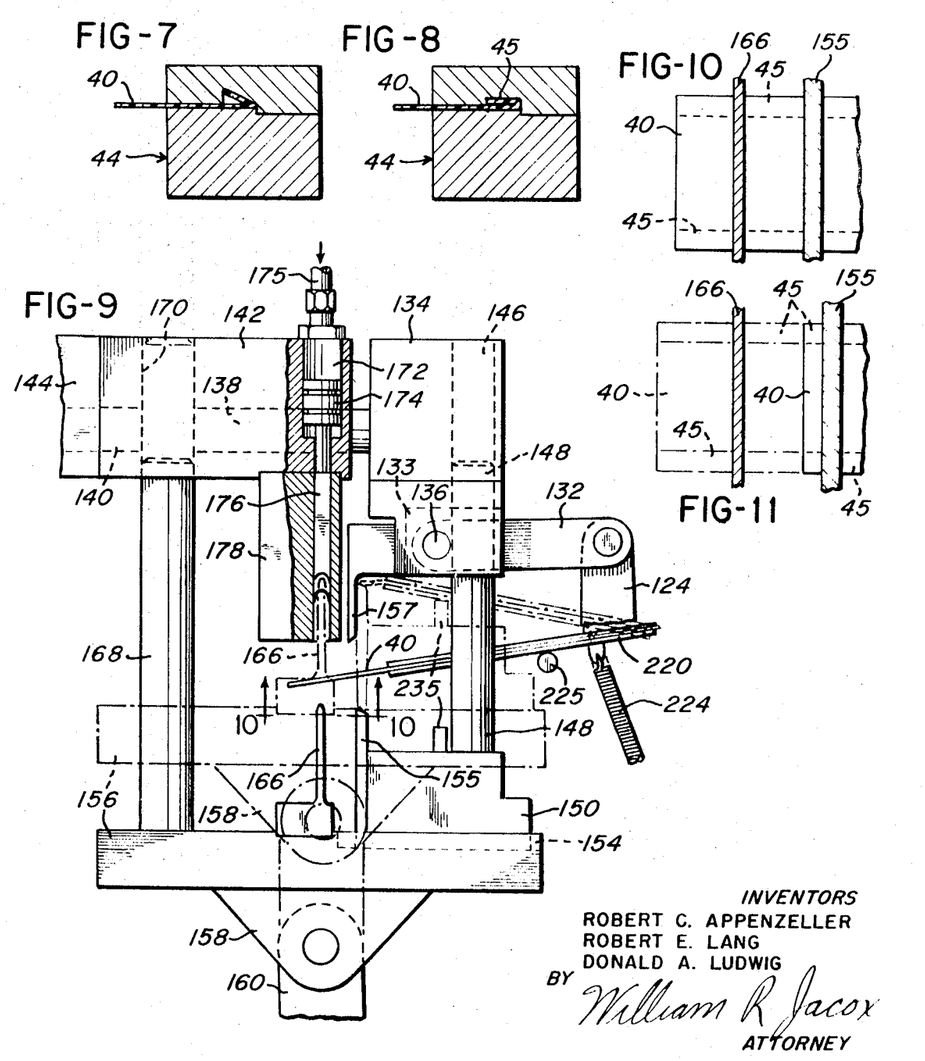
FIG. 7 is a sectional view similar to FIGS. 4, 5, and 6, but showing the cuffing device in a succeeding position of operation.
FIG. 8 is a sectional view similar to FIGS. 4, 5, 6, and 7 but showing the cuffing device in a succeeding position of operation.
FIG. 9 is an enlarged elevational view, with parts broken away and shown in section, of a portion of the apparatus shown in FIG. 3, and illustrating operation thereof.
FIG. 10 is an enlarged sectional view taken substantially on line 10—10 of FIG. 9.
FIG. 11 is an enlarged sectional view similar to FIG. 10 but showing the elements thereof in another position of operation.
Figures 12, 13, 14, 15:
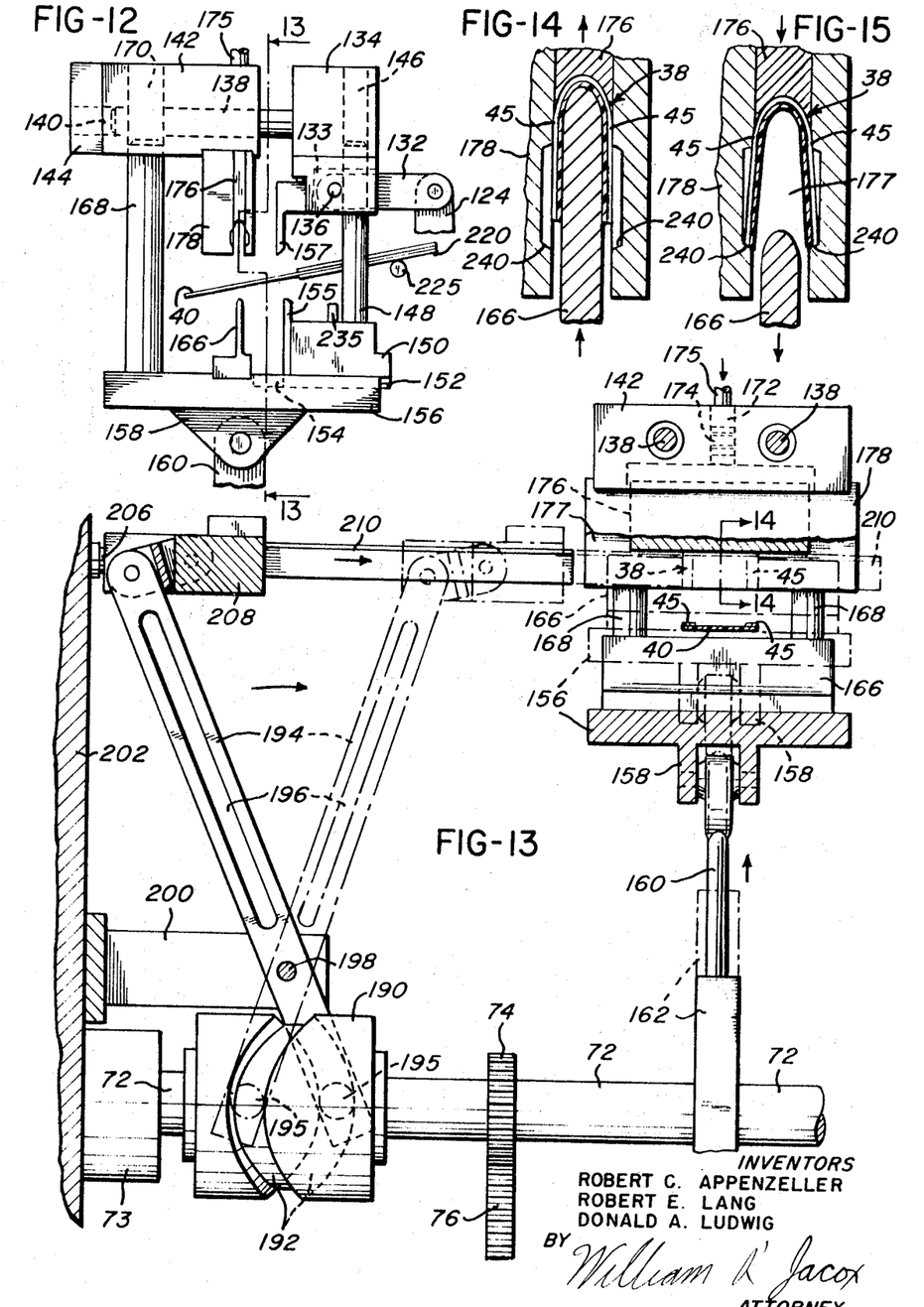
FIG. 12 is an elevational view of the apparatus of FIG. 9, drawn on a smaller scale than FIG. 9, showing a portion of the elements thereof.
FIG. 13 is an enlarged sectional view taken substantially on line 13—13 of FIG. 12.
FIG. 14 is an enlarged sectional view taken substantially on line 14—14 of FIG. 13, showing the elements thereof in a given position of operation.
FIG. 15 is an enlarged sectional view similar to FIG. 14 but showing the elements thereof in a different position of operation.

As shown in FIG. 1, attached to the main shaft 72 is a gear 118 which is in mesh with a gear 120. The gear 120 includes a box type of cam or cam slot 122. An arm 124 has an end portion adjacent the cam 122 with a roller 126 within the box cam 122, as shown in FIGS. 1 and 3. The arm 124 is pivotally carried by a support member 128 at a position intermediate the ends thereof, as shown in FIG. 1. The other end portion of the arm 124 is pivotally attached to a link 132. The link 132 preferably extends loosely into a recess 133 of a block 134 and is pivotally joined thereto by means of a pin 136, as illustrated in FIGS. 9 and 12.

The block 134 has a plurality of slide rods 138 attached thereto and extending therefrom. Each slide rod 138 has a portion thereof slidably disposed within a bore 140 of a fixed base 142, which is supported by suitable support structure 144, as illustrated in FIGS. 9 and 12.

The block 134 has a plurality of bores 146 therein, which are normal to the rods 138. Slidably disposed within each bore 146 is a slide rod 148, which is attached to a pedestal 150. The pedestal 150 has a tongue 152 slidably disposed within a groove 154 of a carriage 156 so that the pedestal 150 is movable with respect to the carriage 156. The pedestal 150 has a knife blade 155 attached thereto which is cooperable with a shear blade 157 which is attached to the block 134. The carriage 156 has a bracket 158 attached thereto to which is pivotally attached a crank 160. The crank 160 is secured to an annular connector or cam follower 162 which encompasses an eccentric 164, shown in FIGS. 1 and 3. The eccentric 164 is attached to the main shaft 72 for rotation therewith.

The carriage 156 has attached thereto a forming blade 166. The carriage 156 also has attached thereto one or more rod members 168, each of which is slidably axially movable within a bore 170 of the base 142. The bores 170 are shown as being substantially normal to the bores 140 and are spaced therefrom.

The base 142, as shown in FIG. 9, has a cavity 172 within which a piston 174 is disposed. A fluid conduit 175 is in communication with the cavity 172 for the introduction of fluid thereinto. Attached to the piston 174 for movement therewith is a forming plunger 176 which is movable within a cavity 177 of a forming die 178, as shown in FIGS. 14 and 15. The stator 30, as it is retained by the retainer member 116 adjacent the forming die 178, has one of the slots 32 thereof in axial alignment with the cavity 177 of the forming die 178.

The main shaft 72, as shown in FIGS. 1 and 13, also has attached thereto a cylinder 190 which is provided with a cam groove 192. A lever 194 has an end portion 195 disposed within the cam groove 192. The lever 194 is shown as having an elongate slot 196 therein for minimizing the weight thereof. A pin 198 pivotally attaches the lever 194 to a fixed bracket 200. The bracket 200 is attached to support structure 202.

Spaced from the main shaft 72 and directed toward the forming die 178 is a pair of support rods 206 which are shown as being supported by the support structure 202. A slide block 208 is slidably carried by the support rods 206 for movement therealong. The slide block 208 is pivotally attached to the end of the lever 194 which is opposite the end portion 195. Attached to the slide block 208 and extending toward the forming die 178 is a push bar 210.

OPERATION

The main shaft 72 is continuously rotated, as illustrated by an arrow 216 in FIG. 1. Thus, inter alia, the eccentric 70 which is attached to the main shaft 72 is continuously rotating. Thus, there is relative rotative movement between the eccentric 70 and the encompassing collar 68. Therefore there is continuous movement of the crank arm 66 which is attached to the collar 68, as the crank arm 66 is moved reciprocally substantially axially.

As stated above and as shown in FIGS. 1 and 21, the end of the crank arm 66 is pivotally attached to the slide block 64, and the block 64 is attached to the yoke 60 by means of the rod 62. Thus, as the crank arm 66 moves reciprocally substantially axially, the crank arm 66 causes reciprocal rotative movement of the yoke 60 and the drive clutch member 58, attached thereto. The drive clutch member 58 rotates through a number of degrees and then rotates through the same number of degrees in the reverse direction, as the yoke 60 is reciprocally angularly moved by the crank arm 66. The driven clutch member 56 rotatably moves only in one direction. Thus, upon each rotative movement of the drive clutch member 58 in one direction, the driven clutch member 56 is rotatively moved through the same angle of movement. However, the driven clutch member 56 does not rotatively move in the opposite direction with the drive clutch member 58. Thus, a ratchet type of drive action upon the driven clutch member 56 occurs.

The yoke 60 and the clutch members 58 and 56 rotatively move about an axis which is substantially coaxial with the axis of rotation of the shaft 54. The degree of reciprocal movement of the yoke 60 and the drive clutch member 58 depends upon the position of the end of the crank arm 66 with respect to the yoke 60. For example, in FIG. 21, the end of the crank arm 66 is shown as being substantially midway between the ends of the yoke 60. If the end of the crank arm 66 as shown in FIG. 21 should be moved to the left, the end of the crank arm 66 would be farther from the axis of rotative movement of the yoke 60 and the clutch member 58. Thus, upon each movement of the crank arm 66 in a direction substantially normal to the sheet upon which FIG. 21 is drawn, the degree of rotative movement of the yoke 60 and the clutch member 58 would be less. Likewise, if the end of the crank arm 66 is moved closer to the axis of rotation of the clutch members 56 and 58, the degree of rotative movement thereof would be greater, with each operation of the crank arm 66.

The position of the end of the crank arm 66 with respect to the yoke 60 is determined by the position of the slide block 64 with respect to the yoke 60. The position of the slide block 64 is determined by the position of the rod 110, which is attached to the slide block 64 and to the carrier 100. As shown in FIGS. 1 and 21, the cam follower 98 which is carried by the carrier 100 is urged by the resilient member 106 into constant engagement with the cam 96. The rotary cam 96 has a plurality of surfaces, each surface being a given distance from the axis of rotation of the shaft 94, which supports the cam 96. When the cam follower 98 is in engagement with a surface of the cam 96 which is farther from the axis of rotation thereof, the carrier 100 is positioned closer to the support block 104. Thus, the rod 110 positions the end of the crank arm 66 closer to the axis of rotation of the clutch members 56 and 58. Thus, each rotative movement of the clutch members 56 and 58 is through a greater angle. Each rotative movement of the driven clutch 56 through a given angle causes rotative movement of the feed roll 50 through the same angle. The feed roll 48 is rotatively driven with rotative movement of the feed roll 50. Due to the fact that the strip 40 is positioned between the feed rolls 48 and 50, upon each rotative movement of the feed rolls, the strip 40 is fed a distance which depends upon the angle of rotative movement of the feed rolls 48 and 50. Thus, it is understood that the angle of rotative movement of the feed rolls 48 and 50, and thus the length of feed operation upon the strip 40, is determined by the rotative position of the cam 96.

The cam 96 is rotatively positioned by rotative movement of the shaft 94, which is rotative by the shaft 86, through the gears 88, 90, and 92. The shaft 86 is rotatively moved by the Geneva wheel 84 which is attached thereto. The Geneva wheel 84 is driven from the main shaft 72, through the Geneva driver 82, and the gears 78, 76, and 74.

The shaft 86 also rotatively positions the stator retainer member 116, through the gears 112, and 114. Due to the fact that the stator 30 is retained by the retainer member 116, the stator 30 rotatively moves with rotative movement of the retainer member 116.

Thus, upon each rotative movement of the Geneva wheel 84 through a given angle, the stator 30 is rotatively positioned so that a given slot 32 thereof is in alignment with the cavity 177 of the forming die 178. Also, as discussed above, upon each rotative movement of the Geneva wheel 84 the cam 96 has a given surface thereof moved in engagement with the cam follower 98, for determining the length of the strip 40 which is formed for the given slot 32. Thus, the cam 96 has a surface thereof which is spaced a predetermined distance from the axis of rotation of the shaft 94 for each stator slot 32 of a predetermined dimension into which a piece of the strip material 40 is to be inserted. For this reason, there is a definite fixed relationship between the shape of the cam 96 and the rotative position thereof and the rotative position of the stator retainer member 116, as established through the shaft 86 and the elements operatively joined thereto. If a slot of large dimensions is to receive a piece of the strip material 40, the surface of the cam 96 which is engaged by the follower 98 is such that the rod 110 positions the end of the crank arm 66 to cause a large angle of rotative movement of the feed rolls 48 and 50. Thus, the portion of the strip 40 which is advanced to a position adjacent blades 155 and 166 is of considerable length.

The strip 40 having been cuffed, as described above and as illustrated in FIGS. 4–8, moves from the feed rolls 48 and 50 toward a strip guide member 220 which has a pair of juxtaposed parallel plates between which the strip 40 moves. The strip guide member 220 is pivotally supported by a support pin 222. A resilient member 224 urges the strip guide member 220 to assume a normal position, as shown in FIGS. 9 and 12, in engagement with an abutment 225, shown in FIG. 9. The strip 40 passes between the parallel plates of the strip guide member 220 and extends therefrom at a position between the forming blade 166 and the forming die 178, as shown in solid lines in FIG. 9 and in FIG. 12. As described above, the length of the strip 40 which extends from the strip guide member 220 is dependent upon the rotative position of the cam 96.

In order to properly form a piece 38 of the strip material 40, the central portion of the piece 38 is positioned directly above the forming blade 166, prior to severance of the piece 38 from the strip 40. Therefore, the central portion of the piece 38 to be severed from the strip 40 is midway between the left hand edge of the strip 40, as viewed in FIGS. 9 and 12, and the knife blade 155, and its cooperating shear blade 157. For this reason, the position of the blades 155 and 157 is adjustable with respect to the strip 40.

As shown and described above, the shear blade 157 is attached to the block 134, and the knife blade 155 is attached to the pedestal 150. The pedestal 150 is attached to the block 134 through the slide rod 148. Due to the fact that the arm 124 has one end thereof within the cam slot 122 and an end portion thereof attached to the block 134, rotative movement of the gear 120 causes the arm 124 to move the block 134 and the pedestal 150 laterally with respect to the carriage 156. Thus, for proper severance of each piece 38 to a proper predetermined length, the shape of the cam slot 122 and the angular relationship of the cooperating elements establishes the position of the blades 155 and 157 with respect to the strip 40. Such positioning of the blades 155 and 157 occurs prior to the severing of each piece 38 to the proper length prior to insertion of the piece 38 into a given slot 32 of the stator 30. For example, when a longer piece 38 is to be severed from the strip 40 for insertion into a larger slot 32 of the stator 30, the cam slot 122 causes the arm 124 to move the block 134 and the pedestal 150 to the right, as viewed in FIGS. 9 and 12. If a shorter piece 38 is to be severed from the strip 40 for insertion into a smaller slot 32 of the stator 30, the cam slot 122 causes the arm 124 to move the block 134 and the pedestal 150 to the left, as viewed in FIGS. 9 and 12. FIG. 12 shows the block 134 and the pedestal 150 moved farther to the right than the position thereof in FIG. 9. FIGS. 10 and 11 illustrate different relative positions between the blades 155 and 166, as the blade 155 is laterally movable with respect to the blade 166 to establish the proper length of a piece 38 prior to severance thereof from the strip 40.

FIG. 10 shows the blade 155 farther to the right than that shown in FIG. 11.

Then the crank 160, through the annular connector 162 and the eccentric 164, moves the carriage 156 upwardly, as illustrated by broken lines in FIG. 9. Thus, the blades 155 and 157 sever from the strip 40 a piece 38 of a predetermined proper length, and the forming blade 166 engages the central portion of the piece 38 and forces the piece 38 into the forming die 178, as best shown in FIG. 14. The central portion of the piece 38 is forced against the forming plunger 176 and the plunger 176 is moved upwardly. As the pedestal 150 is moved upwardly by the carriage 156, a protuberance 235 thereof engages the strip guide member 220 and causes pivotal movement thereof, as illustrated in broken lines in FIG. 9.

Air pressure upon the piston 174 urges the plunger 176 toward the forming blade 166. However, the force of the forming blade 166, as the blade 166 forces a piece 38 into the cavity 17, is capable of causing movement of the plunger 176 as the plunger 176 and the forming blade 166 and the forming die 178 form the piece 38. Air pressure upon the piston 174 provides a predetermined constant pressure upon the plunger 176, regardless of the position thereof.

Then, after formation of the piece 38, the forming blade 166 is retracted, as shown in FIG. 15, as the carriage 156 is moved downwardly by the crank 160. The piece 38 then is moved downwardly by the plunger 176 and the cuffs 45 engage shoulders 240 within the cavity 177.

As this occurs, the strip guide member 220 is returned by the resilient member 224 to its position against the abutment 225, as shown in solid lines in FIG. 9.

Then, as the cylinder 190 rotates, the lever 194, which has an end portion 195 within the cam slot 192 thereof, moves the slide block 208 into the cavity 177 of th e forming die 178. The end of the push bar 210 engages the piece 38 which is within the forming die 178 and forces the piece 38 into the slot 32 of the stator 30 which is aligned with the cavity 177, as illustrated in FIG. 1. Thus, a piece 38 which is of the proper predetermined length and which has been properly formed is inserted into a predetermined slot of the stator 30. The cuffs 45 of the piece 38 engage opposed end surfaces of the stator 30 and retain the position of the piece 38 within its respective slot 32, as shown in FIG. 16.

Then, through rotative movement of the Geneva wheel 84, the shaft 86 is rotatively moved to rotatively move the retainer member 116 and the stator 30 retained thereby so that a succeeding slot 32 of the stator is aligned with the cavity 177 of the forming die 178. With the rotative movement of the retainer member 116, the cam 96 is rotatively moved to properly position the rod 110 and the crank arm 66 for proper rotative movement of the feed rolls 48 and 50.

Thus, a new cycle of operation is commenced.

When a stator 30 having different slot dimensions and/or slot arrangements is to be operated upon while retained by the retainer 116, a cam 96 having a different cam surface formation and a gear 120 having a different cam slot 122 are substituted. Also, different intermediate gears 76, 88, 90, 92, 112, and 114 may be substituted for those shown.

The invention having thus been described the following is claimed.

1. Apparatus for insertion of insulation pieces into stator slots in which the slots are of various dimensions, comprising:
retainer means for retaining a stator so that a given slot thereof is adjacent a forming position,
feed means for movement of a portion of a continuous strip of insulation material to the forming position,
drive means for operation of the feed means,
first adjustment means,
means operatively connecting the first adjustment means to the drive means for adjusting the operation of the drive means so that a predetermined length portion of the strip which is suitable for the given slot of the stator is moved by the feed means to the forming position,
severance means for severance of a piece of insulation material from the portion of the strip of insulation material which is disposed at the forming position,
second adjustment means,
means operatively connecting the second adjustment means to the severance means for adjusting the position of the severance means with respect to the strip so that a piece of the insulation material of a length which is suitable for the given slot is cut at the forming position,
forming means at the forming position for forming the piece of insulation material which is severed from the portion of the strip at the forming position,
insertion means adjacent the forming position for moving the piece of insulation material from the forming means into the given slot of the stator retained by the retainer means.

2. The apparatus of claim 1 which includes connection means operably connecting together the feed means and the drive means and the first adjustment means and the severance means and the second adjustment means and the retainer means and the insertion means so that the operations thereof occur in proper timed relationship.

3. The apparatus of claim 1 in which the feed means includes a pair of roll members,
the drive means including crank means operatively connected to the feed means for rotative movement thereof,
the first adjustment means including means for adjusting the crank means with respect to the feed means so that the length of operative movement of the crank means is changed with respect to the feed means and thus the length of feed operation of the feed means is changed.

4. The apparatus of claim 3 in which the crank means includes:
a crank arm,
a movable member attached to the crank arm so that movement of the movable member changes the degree of crank movement and the degree of rotative movement of the roll members, the first adjustment means including a rod pivotally attached to the movable member and cam means for adjusting the position of the rod and thus adjusting the position of
- the movable member.

5. The apparatus of claim 1 in which the connection means comprises main rotary drive means, and cam means joining the main rotary drive means to the first adjustment means and to the second adjustment means and to the severance means and to the insertion means.

6. Apparatus for inserting pieces of insulator material into slots of a stator in which the slots are of various dimensions, the pieces being severed from a continuous strip of insulator material, comprising:
stationary support structure,
a forming die attached to the stationary support structure,
a carrier supported by the support structure and linearly movable with respect thereto,
a shear member attached to the carrier and movable therewith,
a carriage movable along a line normal to the line of movement of the carrier with respect to the support structure, the carriage being movable toward and away from the carrier,
a pedestal carried by the carriage for movement therewith toward and away from the carrier, the pedestal also being connected to the carrier and movable therewith,
a cutter member attached to the pedestal for movement therewith, the cutter member being cooperable with the shear member to sever a piece of insulator material from a strip of insulator material, a forming member attached to the carriage and movable therewith, the forming member being movable into the forming die for moving a severed piece of insulator material thereinto and for forming the severed piece of insulator material into a desired shape, stator retainer means adjacent the forming member, insertion means adjacent the forming die and operable to move a piece of insulator material from the forming die into a slot of a stator retained by the retainer means.

7. The apparatus of claim 6 which includes a plunger within the forming die, a piston operably connected to the plunger, means for introducing a gas into engagement with the piston for urging movement of the piston and for urging movement of the plunger for forming a piece of insulator material within the forming die, the plunger cooperating with the forming member and the forming die to form a piece of insulator material into a desired shape within the forming die.

8. The apparatus of claim 6 which includes strip guide means pivotally supported adjacent the carriage for directing a portion of a strip of insulator material to a position intermediate the shear member and the cutter member.

9. The apparatus of claim 6 which includes strip drive means for movement of a portion of a strip of material to a position intermediate the shear member and the cutter member.

10. The apparatus of claim 9 which includes rotary drive means operatively joined to the strip drive means for operation of the strip drive means.

11. The apparatus of claim 10 which includes adjustment means operatively joined to the rotary drive means and to the strip drive means for adjusting the operation of the strip drive means.

12. Apparatus for applying pieces of insulation material to the slots of a stator in which the slots are of various dimensions, apparatus having a forming position adjacent which a stator is retained, comprising:

feed means for movement of a strip of insultaion material so that a portion of the continuous strip of insulation material is positioned adjacent the forming position, severance means adjacent the forming position and adjustably movable in a direction along the length of the portion of the strip of material which is adjacent the forming position, the severance means including a first portion, the severance means also having a second portion which is movable toward the first portion for severance of a portion of the strip which is positioned between the first portion and the second portion of the severance means, forming means at the forming position for forming a piece of insulation material severed from the strip thereof, retainer means adjacent the forming position for retaining a stator having slots of various dimensions, a slot of a larger dimension requiring a piece of insulation material which is greater in length than a slot having a lesser dimension, the retainer means being movable to position the stator so that a slot thereof is adjacent the forming means, insertion means for movement of a piece of insulation material from the forming means to a stator slot, first adjustment means, the first adjustment means being operatively joined to the feed means for operation of the feed means so that a predetermined length portion of the strip is moved by the feed means to a position adjacent the forming means, second adjustment means, the second adjustment means being operatively connected to the severance means for movement thereof along the length of the strip of material, connection means joining together the first adjustment means and the second adjustment means and the retainer means so that as the retainer means positions a stator slot of a given dimension adjacent the forming means, the feed means and the severance means and the forming means operate to provide and form a piece of insulation material of a predetermined length for insertion by the insertion means into the stator slot having the given dimension.

13. The apparatus of claim 12 in which the feed means includes a ratchet type of rotary mechanism and a crank joined to the mechanism for operation thereof, and in which the first adjustment means includes means for adjustment of the radius of operation of the crank with respect to the ratchet type of rotary mechanism.

14. The apparatus of claim 13 in which the first adjustment means includes cam means.

15. The apparatus of claim 14 which includes means which operably join the cam means to the retainer means for simultaneous movement thereof.

16. The apparatus of claim 12 which includes crank means attached to the second portion of the severance means for movement thereof toward the first portion of the severance means for severance of a portion of a strip which is positioned between the portions of the severance means, the apparatus also including arm means pivotally attached to the severance means for movement thereof in a direction along the length of the strip, and cam means operably joined to the arm means for pivotal movement thereof.

17. The apparatus of claim 12 in which the forming means includes a forming blade and means joining the forming blade to said portion of the severance means for movement therewith toward the strip.

18. In apparatus for severing a continuous strip comprising:

a stationary member, a first blade, means joining the first blade to the stationary member for movement of the first blade in a direction toward and away from the stationary member, a carriage, means joined to the carriage for movement thereof toward and away from the first blade angularly with respect to the movement of the first blade with respect to the stationary member, a second blade, the second blade being carried by the carriage for movement with the carriage, the second blade also being movable with respect to the carriage, the second blade being movable into cooperating juxtaposition with the first blade for severance of a strip disposed therebetween, means joining the second blade to the first blade for movement of the second blade with the first blade in a direction toward and away from the stationary member.

19. Apparatus for inserting insulator pieces into stator slots in which the stator slots are of various dimensions, the apparatus operating upon a continuous strip of insulator material, comprising:

rotary drive means, a rotary retainer member for retaining a stator having slots of various dimensions, a pair of blade members, means for relative movement of the blade members one toward the other for severing a portion of a strip disposed between the blade members, rotary feed means for feeding a continuous strip of insulator material so that a portion thereof is at a position intermediate the blade members, forming means adjacent the blade members for forming a piece of insulator material which is severed by the blade members from the strip of insulator material,
insertion means for movement of a piece of insulator material from the forming means to a slot of a stator retained by the stator retainer member,
means joining the stator retainer member to the rotary drive means for rotative movement of the stator retainer member to position a stator so that a slot thereof having a given dimension is adjacent the forming means,
means joining the rotary feed means to the rotary drive means for operative movement of the rotary feed means to feed a predetermined length portion of the strip of material to a position adjacent the blade members, the predetermined length portion being in accordance with the dimension of the slot of the stator which is positioned adjacent the forming means,
means joining the rotary drive means to the blade members for relative movement thereof one toward the other to sever the portion of the strip positioned between the blade members,
means joining the forming means to the rotary drive means for forming a piece which is severed from the strip of material,
means joining the insertion means to the rotary drive means for operation of the insertion means to move a piece of the insulator material from the forming means to the slot of the stator which is adjacent the forming means.

20. The apparatus of claim 19 which includes means for lateral movement of the blade members in a direction normal to the direction of relative movement of the blade members one toward the other, and
means joining the rotary drive means to the blade members for movement thereof in a direction normal to the direction of relative movement of the blade members one toward the other.

References Cited
UNITED STATES PATENTS

| | | | |
|---|---|---|---|
| 1,949,739 | 3/1934 | Eaton | 29—598 |
| 2,958,122 | 11/1960 | Turk | 29—205 E |

THOMAS H. EAGER, Primary Examiner